(12) United States Patent
Xu

(10) Patent No.: US 10,509,495 B2
(45) Date of Patent: Dec. 17, 2019

(54) POLARIZER AND TOUCH DISPLAY DEVICE HAVING THE SAME

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Jun Xu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/523,801

(22) PCT Filed: Dec. 17, 2015

(86) PCT No.: PCT/CN2015/097695
§ 371 (c)(1),
(2) Date: May 2, 2017

(87) PCT Pub. No.: WO2017/028423
PCT Pub. Date: Feb. 23, 2017

(65) Prior Publication Data
US 2018/0150161 A1    May 31, 2018

(30) Foreign Application Priority Data
Aug. 19, 2015 (CN) .................... 2015 2 0632207 U

(51) Int. Cl.
*G06F 3/041* (2006.01)
*G02B 5/30* (2006.01)
(Continued)

(52) U.S. Cl.
CPC ............ *G06F 3/0412* (2013.01); *G02B 5/30* (2013.01); *G02F 1/13338* (2013.01); *G02F 1/133528* (2013.01)

(58) Field of Classification Search
CPC ................................ G06F 3/0412; G02B 5/30
See application file for complete search history.

(56) References Cited

U.S. PATENT DOCUMENTS

2009/0086114 A1* 4/2009 Higuchi .............. G02F 1/13338
349/12
2010/0164885 A1* 7/2010 Hosorogi .............. G06F 3/0412
345/173

(Continued)

FOREIGN PATENT DOCUMENTS

CN        202710774 U      1/2013
CN        103149743 A      6/2013
(Continued)

OTHER PUBLICATIONS

International Search Report and Written Opinion for Application No. PCT/CN2015/097695, dated May 13, 2016, 9 Pages.

*Primary Examiner* — Priyank J Shah
(74) *Attorney, Agent, or Firm* — Brooks Kushman P.C.

(57) ABSTRACT

The present disclosure provides a polarizer and touch display device having the same. The polarizer includes a first adhesive film adhering to a liquid crystal display module, a first base material film arranged on the first adhesive film, a polarizing film arranged on the first base material film, a second base material film arranged on the polarizing film, and a second adhesive film adhering to a touch panel arranged on the second base material film.

9 Claims, 4 Drawing Sheets

(51) Int. Cl.
  *G02F 1/1333* (2006.01)
  *G02F 1/1335* (2006.01)

(56) References Cited

U.S. PATENT DOCUMENTS

| | | | | |
|---|---|---|---|---|
| 2012/0113361 | A1* | 5/2012 | Huang | G06F 3/041 |
| | | | | 349/96 |
| 2014/0226085 | A1* | 8/2014 | Katami | G02F 1/13338 |
| | | | | 349/12 |
| 2015/0103053 | A1* | 4/2015 | Lin | G06F 3/0412 |
| | | | | 345/175 |
| 2017/0139262 | A1* | 5/2017 | Liu | G02B 1/14 |
| 2018/0224983 | A1* | 8/2018 | Zhang | G06F 3/041 |
| 2018/0267221 | A1* | 9/2018 | Oowada | G02F 1/1335 |

FOREIGN PATENT DOCUMENTS

| | | | | |
|---|---|---|---|---|
| CN | 103440068 A | 12/2013 | | |
| CN | 104166483 A | 11/2014 | | |
| CN | 204256327 U | 4/2015 | | |
| CN | 204382732 U | 6/2015 | | |
| JP | 2014102353 A | 6/2014 | | |
| JP | 2015-0022536 | * | 1/2015 | ........... G02F 1/1335 |

\* cited by examiner

POLARIZER AND TOUCH DISPLAY DEVICE HAVING THE SAME

CROSS-REFERENCE TO RELATED APPLICATIONS

This application is the U.S. national phase of PCT Application No. PCT/CN2015/097695 filed on Dec. 17, 2015, which claims priority to Chinese Patent Application No. 201520632207.0 filed on Aug. 19, 2015, the disclosures of which are incorporated in their entirety by reference herein.

TECHNICAL FIELD

The present disclosure relates to the field of polarizer technology, and more particularly to a polarizer and a touch display device having the same.

BACKGROUND

A polarizer is one of the essential components in a liquid crystal display device. A conventional common polarizer mainly includes a release film, an adhesive arranged on the release film, a lower base material film arranged on the adhesive, a polarizing film arranged on the lower base material film and an upper base material film arranged on the polarizing film. The polarizer adheres to a liquid crystal display module through the adhesive. Then, the touch panel and the liquid crystal display module adhere to each other by an air bonding solution; thereby the polarizer is arranged between them.

The air bonding solution is a solution for adhering a liquid crystal display module and a touch panel together. In the solution, a periphery of the polarizer is provided with a certain thickness of air bonding adhesive to adhere the touch panel and the liquid crystal display module together through the air bonding adhesive. In the solution, the liquid crystal display module merely adheres around a periphery of the touch panel; so that there exists a gap between the polarizer and the touch panel. As a result, an air layer may be liable to be generated, thereby resulting in a poor light transmittance of the liquid crystal display device, and easy generation of the Newton ring.

SUMMARY

In one aspect, the present disclosure provides in some embodiments a polarizer, including a first adhesive film adhering to a liquid crystal display module, a first base material film arranged on the first adhesive film, a polarizing film arranged on the first base material film, and a second base material film arranged on the polarizing film. A second adhesive film adhering to a touch panel is arranged on the second base material film.

In an embodiment of the present disclosure, an area of the second adhesive film is less than or equal to that of the second base material film.

In another embodiment of the present disclosure, a thickness of the second adhesive film is in the range of 50 μm to 200 μm.

In another embodiment of the present disclosure, the second adhesive film is a pressure-sensitive adhesive film or an optical clear adhesive film.

In another embodiment of the present disclosure, both the first base material film and the second base material film are made of tri-cellulose acetate.

In another embodiment of the present disclosure, the second base material film is a hardened tri-cellulose acetate base material film.

In another embodiment of the present disclosure, the polarizer further includes a release film for protecting the second adhesive film, and the release film is arranged on the second adhesive film.

In another aspect, the present disclosure provides in some embodiments a touch display device, including a touch panel, a liquid crystal display module, an air bonding adhesive, and the above polarizer. The polarizer is arranged on the liquid crystal display module, the touch panel is arranged on the polarizer, and the touch panel adheres to the liquid crystal display module or the polarizer through the air bonding adhesive.

In an embodiment of the present disclosure, a thickness of the air bonding adhesive is less than or equal to that of the polarizer.

In another embodiment of the present disclosure, the air bonding adhesive includes four air bonding adhesive tapes, the four air bonding adhesive tapes are arranged on the liquid crystal display module and around a periphery of the polarizer, and a thickness of each of the four air bonding adhesive tapes is identical to that of the polarizer.

In another embodiment of the present disclosure, the touch panel adheres to the liquid crystal display module through the four air bonding adhesive tapes.

In another embodiment of the present disclosure, the air bonding adhesive includes four air bonding adhesive tapes, the four air bonding adhesive tapes are each arranged on the second base material film, and the air bonding adhesive tapes are arranged along four sides of the second base material film, and a thickness of each of the four air bonding adhesive tapes is less than that of the polarizer.

In another embodiment of the present disclosure, the touch panel adheres to the polarizer through the four air bonding adhesive tapes, and the polarizer adheres to the liquid crystal display module.

In another embodiment of the present disclosure, a profile of each of two ends of each lamination adhesive tape is of a step-like shape, and profiles of every two adjacent air bonding adhesive tapes are coupled to each other on a lamination plane of the touch panel and the liquid crystal display module.

BRIEF DESCRIPTION OF THE DRAWINGS

In order to illustrate technical solutions according to embodiments of the present disclosure, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

In order to make the objects, the technical solutions and the advantages of the present disclosure more apparent, the present disclosure will be described hereinafter in a detailed manner in conjunction with the drawings.

Unless otherwise defined, any technical or scientific terms used herein have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

Figure 1:
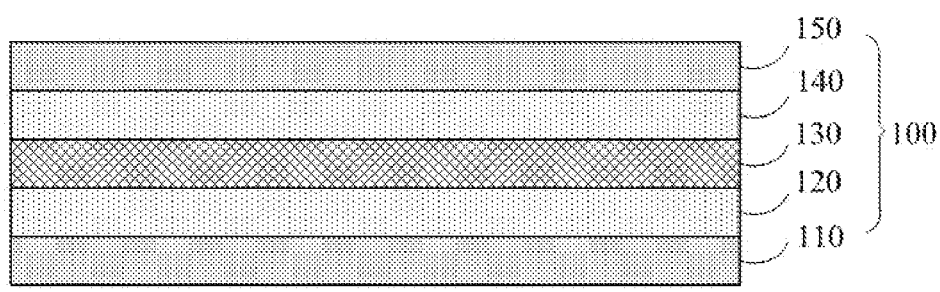
FIG. 1 is a schematic diagram showing a polarizer according to some embodiments of the present disclosure.

FIG. 1 shows a polarizer 100 according to an embodiment of the present disclosure. As shown in FIG. 1, the polarizer 100 includes: a first adhesive film 110 adhering to a liquid crystal display module, a first base material film 120 arranged on the first adhesive film 110, a polarizing film 130 arranged on the first base material film 120 and a second base material film 140 arranged on the polarizing film 130. And a second adhesive film 150 adhering to a touch panel is arranged on the second base material film 140.

In the embodiment, the second adhesive film 150 is arranged on the second base material film 140, which enables the polarizer 100 to adhere to the touch panel through the second adhesive film 150, thus filling the gap between the polarizer 100 and the touch panel due to the air bonding, thereby preventing the transmittance of the touch display device from being decreased due to the gap, and avoiding the occurrence of Newton ring.

In the embodiment, an area of the second adhesive film 150 is equal to that of the second base material film 140.

In an embodiment of the present disclosure, first adhesive film 110 may be a pressure-sensitive adhesive (PSA) film, which enables the polarizer 100 to adhere to the liquid crystal display module quickly through the first adhesive film 110, and prevents the polarizer 100 from being separated from the liquid crystal display module easily due to an external shear force. It should be noted that, in practical use, the first adhesive film 110 is not limited to the above optional solution, and may also be other types of adhesive film such as an ethylene-vinyl acetate copolymer (EVA) film and the like, which will not be limited in the embodiment.

In an embodiment of the present disclosure, both the first base material film 120 and the second base material film 140 are made of tri-cellulose acetate, which makes an optical path difference generated after the light passing through the first base material film 120 and the second base material film 140 to be zero.

In an embodiment of the present disclosure, the polarizing film 130 may be a polyvinyl alcohol (PVA) polarizing film for transforming a natural light into a polarized light.

In an embodiment of the present disclosure, the second adhesive film 150 is a pressure-sensitive adhesive (PSA) film or an optical clear adhesive (OCA) film, and it is comprehensively considered in accordance with performances, costs, processing difficulties and the like, of the pressure-sensitive adhesive film and the optical clear adhesive film. Optionally, the second adhesive film 150 is a pressure-sensitive adhesive film. It should be noted that, in practical use, the second adhesive film 150 is not limited to the above optional solution, and may also be other types of adhesive film such as an optical clear resin (OCR) adhesive film.

In an embodiment of the present disclosure, a thickness of the second adhesive film 150 is in the range of 50 μm to 200 μm, for example, 100 μm or 150 μm. When the thickness of the second adhesive film 150 is in the range of 50 μm to 200 μm, it is able not only to ensure that the second adhesive film 150 adheres the polarizer 100 and the touch panel firmly together, but also guarantee a transmissivity of the second adhesive film 150.

In the above embodiment, since there exists only one second adhesive film 150 between the second base material film 140 and the touch panel, the second base material film 140 may be a hardened tri-cellulose acetate base material film to protect the polarizing film 130.

Figure 2:
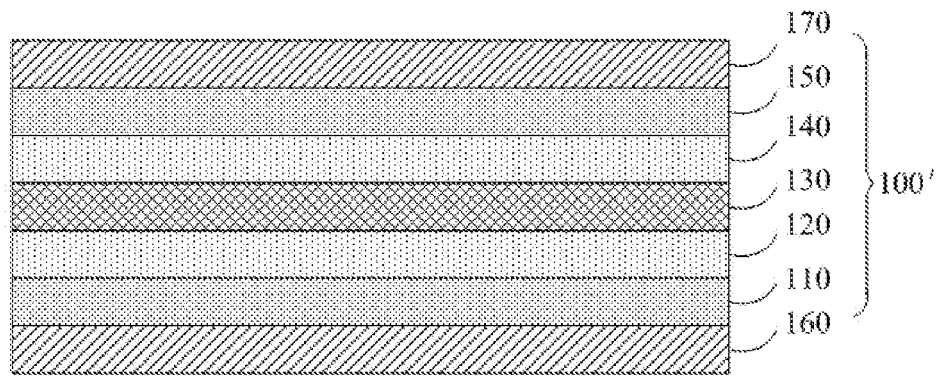
FIG. 2 is a schematic diagram showing a polarizer according to some embodiments of the present disclosure.

FIG. 2 shows another polarizer 100' according to an embodiment of the present disclosure. Referring to FIG. 2, compared with the polarizer shown in FIG. 1, the polarizer 100' shown in FIG. 2 further comprises a release film 160 arranged on first adhesive film 110 and a release film 170 arranged on the second adhesive film 150 to protect the first adhesive film 110 and the second adhesive film 150. It is easy to be understood that, before adhering the polarizer 100' and the touch panel together through the second adhesive film 150, the release film 170 arranged on the second adhesive film 150 can be stripped off first, to fully use the viscidity of the second adhesive film 150. Similarly, before adhering the polarizer 100' and the liquid crystal display module together through the first adhesive film 110, the release film 160 arranged on the first adhesive film 110 may be stripped off first, to fully use the viscidity of the first adhesive film 110.

Figure 3:
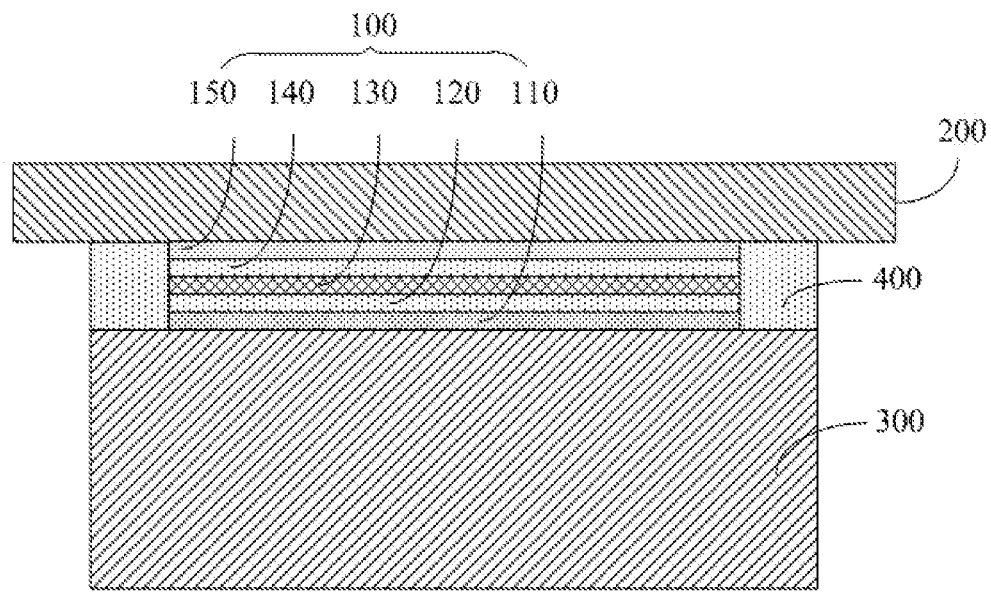
FIG. 3 is a schematic diagram showing a touch display device according to some embodiments of the present disclosure.

FIG. 3 shows a touch display device according to an embodiment of the present disclosure. As shown in FIG. 3, the touch display device includes: a touch panel 200, a liquid crystal display module 300, an air bonding adhesive 400 and a polarizer 100. The polarizer 100 is arranged on the liquid crystal display module 300, the touch panel 200 is arranged on the polarizer 100, and the touch panel 200 adheres to the liquid crystal display module 300 through the air bonding adhesive 400. The polarizer 100 may be identical to the above polarizer 100, which will not be repeated herein.

In an embodiment of the present disclosure, a thickness of the air bonding adhesive 400 is equal to that of the polarizer 100, so that the second adhesive film 150 fully fills up the gap between the polarizer 100 and the touch panel 200.

It is easy to be understood that, since the air bonding adhesive 400 is in contact with the touch panel 200, a contact area between the polarizer 100 and the touch panel 200 is decreased, thereby decreasing a painting area of the second adhesive film 150, and reducing the cost of production.

Figure 4:
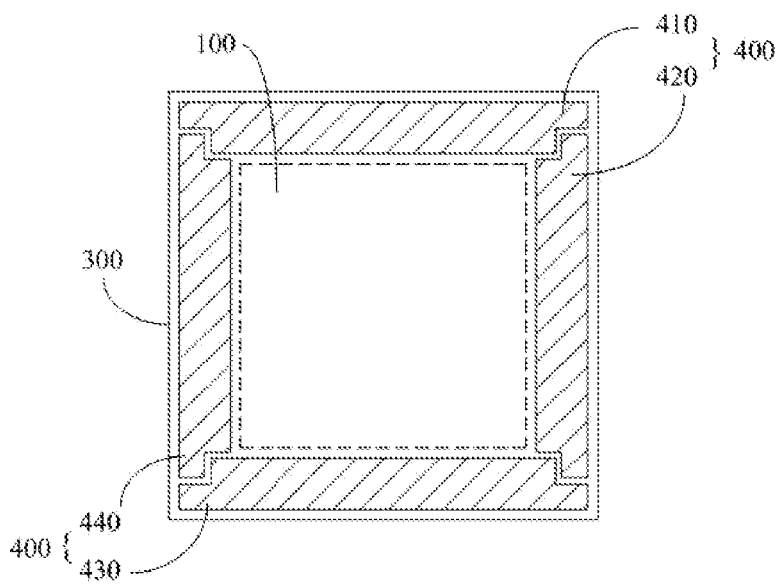
FIG. 4 is a schematic diagram showing an arrangement of an air bonding adhesive according to some embodiments of the present disclosure.

Referring to FIG. 4, in an embodiment of the present disclosure, the air bonding adhesive 400 includes four air bonding adhesive tapes. The four air bonding adhesive tapes are arranged on the liquid crystal display module 300 and around a periphery of the polarizer 100, and a thickness of each of the four air bonding adhesive tapes is identical to that of the polarizer 100. The four air bonding adhesive tapes are a first air bonding adhesive tape 410, a second air bonding adhesive tape 420, a third air bonding adhesive tape 430 and a fourth air bonding adhesive tape 440. By dividing the air bonding adhesive 400 into the first air bonding adhesive tape 410, the second air bonding adhesive tape 420, the third air bonding adhesive tape 430 and the fourth air bonding adhesive tape 440 to adhere the polarizer 100, it may effectively reduce a difficulty of adhering the air bonding adhesive 400, thus improving a yield rate.

In an embodiment of the present disclosure, the touch panel adheres to the liquid crystal display module 300 through the four air bonding adhesive tapes.

In an embodiment of the present disclosure, adjacent two air bonding adhesive tapes are perpendicular to each other, a profile of each of two ends of each air bonding adhesive tape is of a step-like shape, and profiles of every two adjacent air bonding adhesive tapes are coupled to each other on a lamination plane of the touch panel and the liquid crystal display module 300, so as to ensure water vapors entered into the polarizer 100 during processing to be able to diffuse from a gap between the air bonding adhesive tapes. Moreover, since the gap is of a step-like shape, it is very difficult for dusts to enter the gap from the outside, thus a dust proof function is achieved.

In addition to the above, the shape of the profile of each of two ends of each air bonding adhesive tape is not limited in the present disclosure, and it may also be of a saw tooth-shape and other polygon-shape.

Introduced briefly below is a manufacturing process of a touch display device in embodiments of the present disclosure.

I. Providing the polarizer 100' as shown in FIG. 2. The release film 160 is arranged on an outside surface of the first adhesive film 110 of the polarizer 100', and the release film 170 is arranged on an outside surface of the second adhesive film 150.

Figure 5:
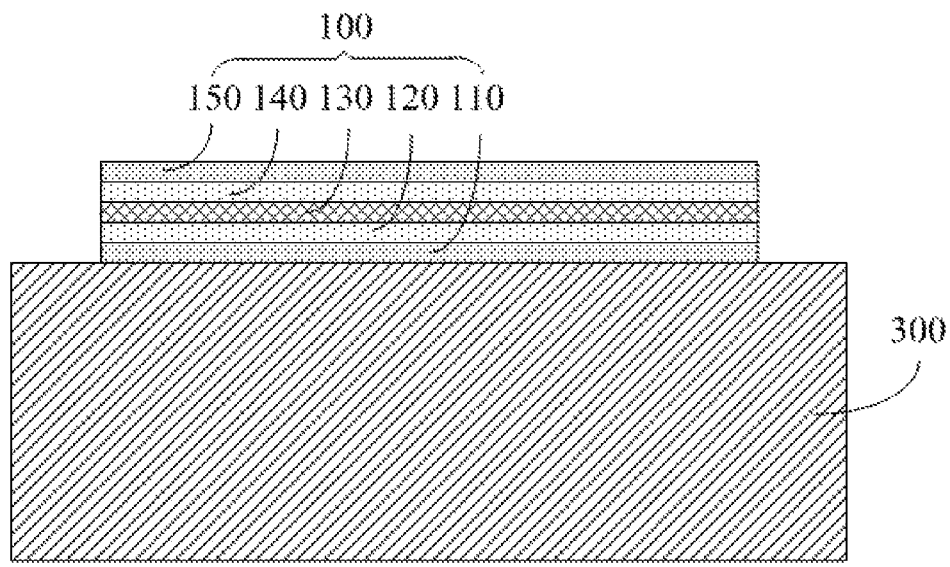
FIG. 5 is a schematic diagram showing adhesion of a liquid crystal display module according to some embodiments of the present disclosure.

II. Adhering polarizer 100' and the liquid crystal display module 300. The release film 160 (see FIG. 2) on the first adhesive film 110 is stripped off; and the polarizer 100' is adhered to the liquid crystal display module 300 through the first adhesive film 110, an outline of the liquid crystal display module 300 being of 2 mm to 3 mm larger than that of the polarizer 100' (see FIG. 5).

Figure 6:
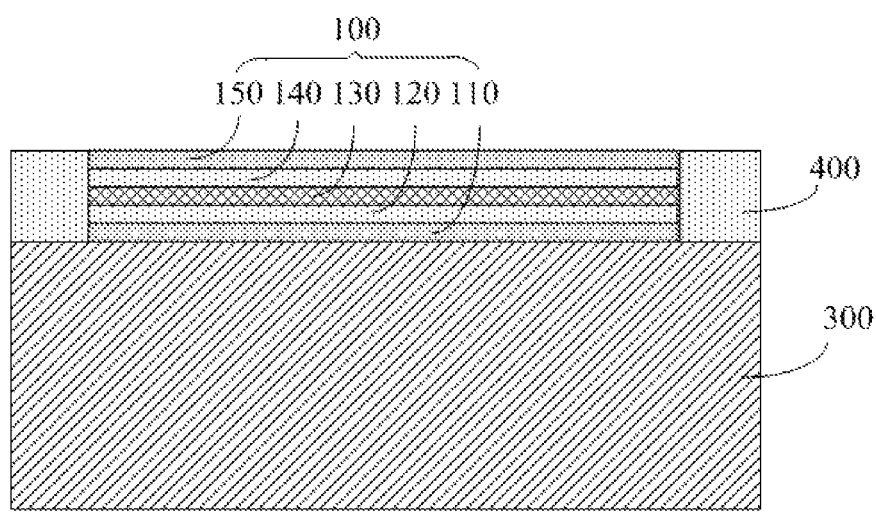
FIG. 6 is a schematic diagram showing adhesion of an air bonding adhesive according to some embodiments of the present disclosure.

III. Adhesion of air bonding adhesive. The first air bonding adhesive tape 410, the second air bonding adhesive tape 420, the third air bonding adhesive tape 430 and the fourth air bonding adhesive tape 440 (see FIG. 4) are adhered to corresponding edges of the liquid crystal display module 300 respectively along corresponding outlines of the polarizer 100, and the first air bonding adhesive tape 410, the second air bonding adhesive tape 420, the third air bonding adhesive tape 430 and the fourth air bonding adhesive tape 440 are arranged around the polarizer 100 (see FIG. 6).

IV. Adhesion of the touch panel 200. The release film 170 on the second adhesive film 150 (see FIG. 2) are stripping off, and the touch panel 200 is adhered to the liquid crystal display module 300 through the air bonding adhesive 400 and the second adhesive film 150 (see FIG. 3).

Figure 7:
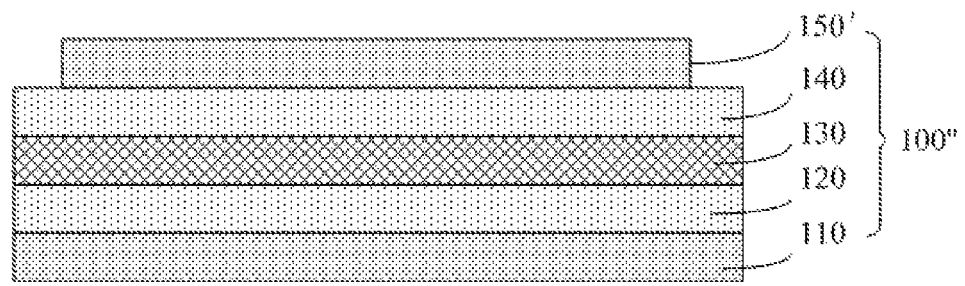
FIG. 7 is a schematic diagram showing a polarizer according to some embodiments of the present disclosure.

FIG. 7 shows another polarizer 100" according to an embodiment of the present disclosure. Referring to FIG. 7, compared with the polarizer 100 shown in FIG. 1, the structure of the polarizer 100" is basically identical to that of the above polarizer 100, and the difference is that, an area of the second adhesive film 150' of the polarizer 100" is less than that of the second base material film 140.

Figure 8:
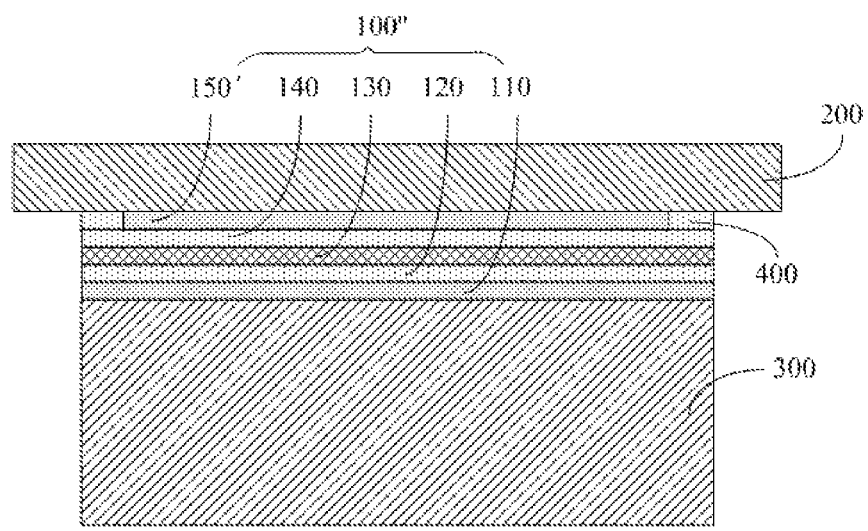
FIG. 8 is a schematic diagram showing a touch display device according to some embodiments of the present disclosure.

FIG. 8 shows another touch display device according to an embodiment of the present disclosure. Referring to FIG. 8, compared with the structure of the touch display device shown in FIG. 3, the structure is basically identical to that of the above touch display device, and the difference is that, the touch display device includes the polarizer 100", the four air bonding adhesive tapes are arranged along four sides of second base material film 140, and a thickness of each of the four air bonding adhesive tapes is identical to that of the second adhesive film 150'. Therefore, a thickness of each of the four air bonding adhesive tapes is less than that of the polarizer 100". It is easy to understand that, the second adhesive film 150' is arranged in a space enclosed by the air bonding adhesive 400, which enables the second base material film 140 of the polarizer 100" to adhere to the touch panel 200 through the air bonding adhesive 400. Moreover, the adhesion of the touch panel 200 and the liquid crystal display module 300 depends on the polarizer 100", and other identical structures will not be repeated herein.

The above embodiments of the present disclosure shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A touch display device, comprising a touch panel, a liquid crystal display module, an air bonding adhesive and a polarizer, wherein
   the polarizer comprises a first adhesive film adhering to a liquid crystal display module, a first base material film arranged on the first adhesive film, a polarizing film arranged on the first base material film, a second base material film arranged on the polarizing film, and a second adhesive film adhering to a touch panel arranged on the second base material film;
   the polarizer is arranged on the liquid crystal display module;
   the touch panel is arranged on the polarizer;
   and the touch panel adheres to the liquid crystal display module or the polarizer through the air bonding adhesive;
   wherein the air bonding adhesive comprises four air bonding adhesive tapes,
   the four air bonding adhesive tapes are each arranged on the second base material film of the polarizer, and the air bonding adhesive tapes are arranged along four sides of the second base material film, and
   a thickness of each of the four air bonding adhesive tapes is identical to that of the second adhesive film of the polarizer.

2. The touch display device according to claim 1, wherein a thickness of the air bonding adhesive is less than or equal to that of the polarizer.

3. The touch display device according to claim 1, wherein the touch panel adheres to the polarizer through the four air bonding adhesive tapes, and
   the polarizer adheres to the liquid crystal display module.

4. The touch display device according to claim 1, wherein an area of the second adhesive film is less than or equal to that of the second base material film.

5. The touch display device according to claim 1, wherein a thickness of the second adhesive film is in the range of 50 µm to 200 µm.

6. The touch display device according to claim 1, wherein the second adhesive film is a pressure-sensitive adhesive film or an optical clear adhesive film.

7. The touch display device according to claim 1, wherein both the first base material film and the second base material film are made of tri-cellulose acetate.

8. The touch display device according to claim 1, wherein the second base material film is a hardened tri-cellulose acetate base material film.

9. The touch display device according to claim 1, wherein the polarizer further comprises a release film for protecting the second adhesive film, and the release film is arranged on the second adhesive film.

* * * * *